United States Patent [19]

Ogawa

[11] Patent Number: 5,625,261
[45] Date of Patent: Apr. 29, 1997

[54] STABILIZING CIRCUIT FOR STABILIZING THE HORIZONTAL PICTURE SIZE ON THE DISPLAY OF A TELEVISION RECEIVER

[75] Inventor: Tsutomu Ogawa, Tokyo, Japan

[73] Assignee: Pioneer Electronic Corporation, Tokyo, Japan

[21] Appl. No.: 604,393

[22] Filed: Feb. 21, 1996

[30] Foreign Application Priority Data

Feb. 23, 1995 [JP] Japan .................. 7-035339

[51] Int. Cl.$^6$ .................. H01J 29/70
[52] U.S. Cl. .................. 315/411; 363/21; 348/730
[58] Field of Search .................. 315/411; 348/372, 348/730; 363/21

[56] References Cited

U.S. PATENT DOCUMENTS

| 5,276,604 | 1/1994 | Messman | 363/21 |
| 5,304,898 | 4/1994 | Kataoka et al. | 315/411 |
| 5,420,484 | 5/1995 | Morrish | 315/408 |

Primary Examiner—Theodore M. Blum
Attorney, Agent, or Firm—Morgan, Lewis and Bockius LLP

[57] ABSTRACT

There is provided a stabilizing circuit for stabilizing the horizontal picuture size on the display of a television receiver, wherein a video signal containing a horizontal synchronizing signal having a horizontal scanning frequency is inputted. Said stabilizing circuit comprises: a horizontal output circuit for receiving a signal sychronizing with said synchronizing signal and corresponding to said horizontal scanning frequency, and for supplying a horizontal deflection current; a power source for supplying an electric power to the above horizontal output circuit; a control transistor connected between the power source and the horizontal output circuit; an output voltage generating circuit for generating an output voltage corresponding to an output pulse from the horizontal output transistor; a multiplier for multiplying the output from the control transistor with a predetermined multiple; an adder for adding together the output from the multiplier and the output from the output voltage generating circuit, thereby controlling the control transistor by virtue of the output from the adder.

4 Claims, 2 Drawing Sheets

STABILIZING CIRCUIT FOR STABILIZING THE HORIZONTAL PICTURE SIZE ON THE DISPLAY OF A TELEVISION RECEIVER

BACKGROUND OF THE INVENTION

The present invention relates to a stabilizing circuit for stabilizing the horizontal picture size on the display of a television receiver, in particular to a stabilizing circuit for a television receiver of a multi-scanning type which is capable of receiving various video signals having different horizontal scanning frequencies.

There has been known a television receiver of a multi-scanning type, which serves as a common receiver to receive several kinds of video signals including television broadcast signals as well as personnel computer signals.

However, in such a television receiver of multi-scanning type, it is required that horizontal picture size be stabilized. In order to achieve this, although the horizontal scanning frequency might vary within a range of 15–37 KHz, it is necessary to stabilize a horizontal amplitude and high voltage output to CRT (cathode-ray tube), thereby stabilizing the horizontal picture size.

FIG. 4 indicates an example of a conventional stabilizing circuit for stabilizing the horizontal picture size on the display of a television receiver. As shown in FIG. 4, this conventional circuit includes a horizontal osillator 10, a horizontal output stabilizing circuit 20, and a horizontal output circuit 30.

In FIG. 4, the horizontal oscillator 10 comprises a VCO (voltage-control oscillator) using a multi-vibrator. The osillating frequency of the VCO is controlled by a control voltage from a horizontal AFC (automatic frequency controller) (not shown), thus the osillating frequency of the VCO may synchronize with a horizontal synchronizing signal so as to have the same frequency as the synchronizing signal. In this way, when a video signal having a different horizontal scanning frequency is received, the control voltage from the horizontal AFC will change, therefore the frequency of pulse output from the horizontal osillator 10 will also be changed corresponding to the horizontal scanning frequency.

The horizontal output stabilizing circuit 20 has a control transistor Tr1 which is provided with a power source +B on the collector side thereof, and a transformer T which has a ratio 1:1 of primary voltage to secondary voltage. With the control of the transistor Tr1, an output pulse Vb from the secondary coil of the transformer T is maintained constant. Therefore, it is possible to maintain constant a horizontal collector pulse Va (collector voltage) of a horizontal output transistor Tr2 which is shown in the drawing and will be described in detail later.

Namely, in order that the output pulse Vb may be maintained constant, a voltage difference as compared with a reference voltage Vref is output from a differential amplifier 21. Thus, an output corresponding to this voltage difference controls the impedance of the transistor Tr1. In this way, an output Vcc corresponding to the aforesaid voltage difference is outputted at the emitter of the transistor Tr1, and then applied to the primary coil of the transformer T.

On the other hand, the horizontal output circuit 30 is a circuit which includes, as arranged in a manner shown in FIG. 1, a horizontal deflection coil LH, a horizontal output transistor Tr2, a resonant capacitor $C_R$, a damper diode $D_D$, and a correction capacitor Cs. By supplying a horizontal deflection current iH to the horizontal deflection coil LH, a desired horizontal deflection output may be obtained. When the transistor Tr2 is ON, the horizontal deflection current iH flows into the horizontal deflection coil LH. When the transistor Tr2 is OFF, the horizontal deflection current iH which had flowed into the coil LH will flow into the resonant capacitor $C_R$. Afterwards, the electric charges accumulated in the resonant capacitor $C_R$ are discharged through the horizontal deflection coil LH, the back electromotive force of the coil LH causes the conducting of the damper diode $D_D$, so that the electromagnetic energy of the coil LH is caused to feedback to the correction capacitor Cs. In this way, the horizontal deflection current iH flowing through the damper diode $D_D$ into the coil LH decreases and soon become zero, thereby obtaining a horizontal deflection output having a saw-tooth waveform.

During the horizontal blanking interval, a pulse Va occurs at the collector side of the transistor Tr2 and at the horizontal deflection coil LH, and such pulse Va is applied to the primary coil of of the transformer T.

Accordingly, an output pulse Vb occurs at the secondary coil of the transformer T. After such an output pulse Vb is smoothed through a rectifying/smoothing circuit including a diode D1 and a capacitor C1, the pulse Vb is inputted into the differential amplifier 21. With the use of a voltage difference as compared with the reference voltage Vref, the control transistor Tr1 is controlled, so that the output pulse Vb on the secondary side of the transformer T is maintained constant.

However, in the conventional stabilizing circuit illustrated in FIG. 4, when there is an increase in the horizontal scanning frequency of a horizontal cychronizing signal being input into the base of the transistor Tr2, there will be an increase in The frequency of the horizontal collector pulse (collector voltage), hence the horizontal deflection output becomes small, resulting in an unstable horizontal picture size on a television display. Accordingly, the output Vcc from the emitter of the transistor Tr1 should be increased so as to maintain constant the horizontal deflection output.

That is, when the ratio of the primary voltage to the secondary voltage of the horizontal output transformer T is 1:1, and when the output pulse Vb from the secondary coil thereof is caused to feedback under a stabilized level, the collector pulse (collector voltage) Va of the horizontal output transistor Tr2 may be expressed in the flowing equation.

$$Va = (\pi/2) \cdot (ts/tr) \cdot Vcc \quad (1)$$

Thus, $$\begin{aligned} Vcc &= (2/\pi) \cdot (tr/ts) \cdot Va \quad (2)\\ &= (2/\pi) \cdot [tr/(T-tr)] \cdot Va\\ &= (2/\pi) \cdot [tr/(1/f-tr)] \cdot Va\\ &= (2/\pi) \cdot (f \cdot tr)/(1-f \cdot tr)] \cdot Va \end{aligned}$$

where
tr is blanking interval (constant)
ts is scanning time
T is cycle
f (=1/T) is horizontal scanning frequency As is understood from the above equation (2), when the horizontal scanning frequency f changes, the output Vcc is not completely proportional to such frequency f. As a result, it is impossible to maintain constant the collector pulse (collector voltage) Va of the horizontal output transistor Tr2, hence it is difficult to stabilize the horizontal picture size on

3 the display of a television receiver if the horizontal scanning frequency changes.

SUMMARY OF THE INVENTION

An object of the present invention is to solve the above-mentioned problem peculiar to the above-described prior art and to provide an improved stabilizing circuit for stabilizing the horizontal picture size on the display of a television receiver, which is capable to stabilize the horizontal picture size on the display of a television receiver, irrespective of a change in the horizontal scanning frequency.

According to the present invention, there is provided a stabilizing circuit for stabilizing the horizontal picture size on the display of a television receiver, wherein a video signal containing a horizontal synchronizing signal having a horizontal scanning frequency is inputted. Said stabilizing circuit comprises a horizontal output circuit including a horizontal output transistor and a horizontal deflection coil for receiving a signal sychronizing with said horizontal synchronizing signal and corresponding to said horizontal scanning frequency and for supplying a horizontal deflection current; a power source for supplying an electric power to the above horizontal output circuit; a control transistor connected between the power source and the horizontal output transistor; an output voltage generating circuit for generating an output voltage corresponding to an output pulse from the horizontal output transistor; a multiplier for multiplying the output from the control transistor with a predetermined multiple; an adder for adding together the output from the multiplier and the output from the output voltage generating circuit, thereby controlling the control transistor by virtue of the output from the adder.

In one aspect of the present invention, said output voltage generating circuit comprises: a transformer whose primary coil is connected between the horizontal output transistor and the control transistor; a rectifying/smoothing circuit connected on the secondary coil of the transformer. 10 The voltage ratio of the primary coil to the secondary coil of the transformer is 1:N (N is a positive natural number). The output from the rectifying/smoothing circuit is fed to the adder, whilst the multiplier multiplies the output from the control transistor with $(\pi/2) \cdot N$ before said output is fed to the adder.

In another aspect of the present invention, the output voltage generating circuit comprises a rectifying/smoothing circuit for directly rectifying the output of the horizontal output circuit. The output from the rectifying/smoothing circuit is fed to the adder, whilst the multiplier multiplies the output from the control transistor with $(\pi/2-1)$ before said output is fed to the adder.

The other objects and features of the present invention will become understood from the following description with reference with the accompanying drawings.

DETAILED DESCRIPTION OF THE PREFERRED EMBODIMENTS

Figure 1:
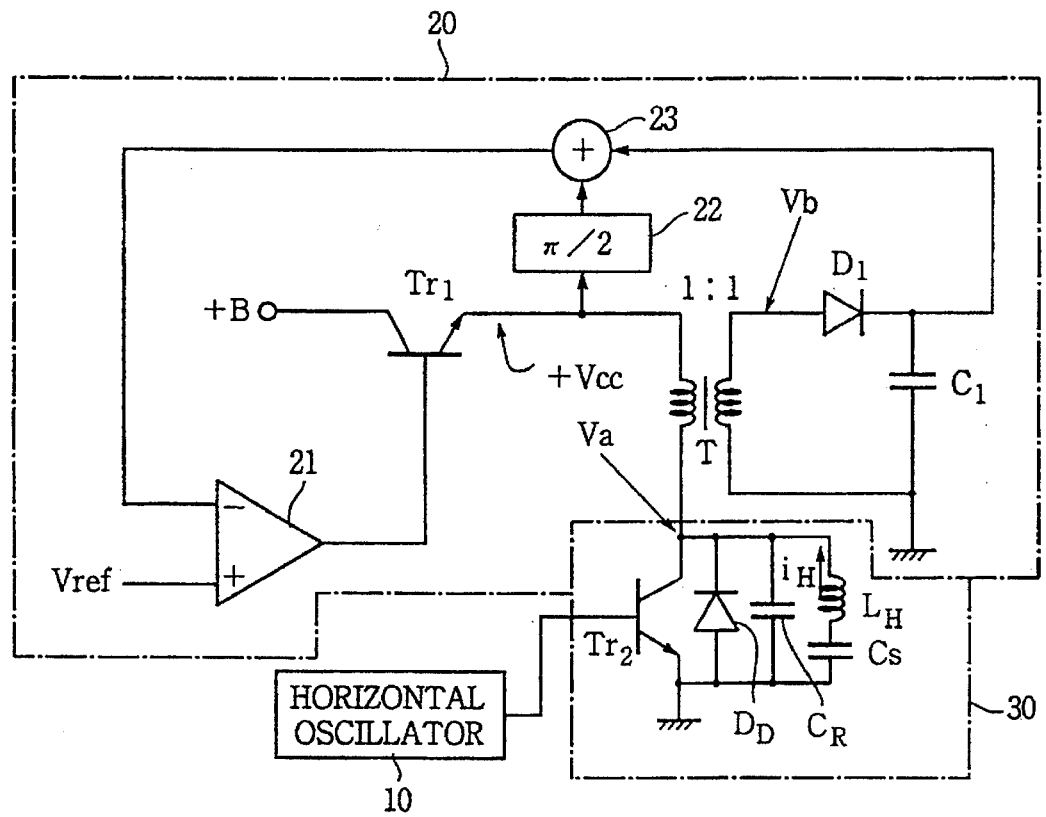
FIG. 1 is a schematic diagram showing an improved stabilizing circuit for stabilizing the horizontal picture size on the display of a television receiver, according to the first embodiment, of the present invention.
Figure 4:
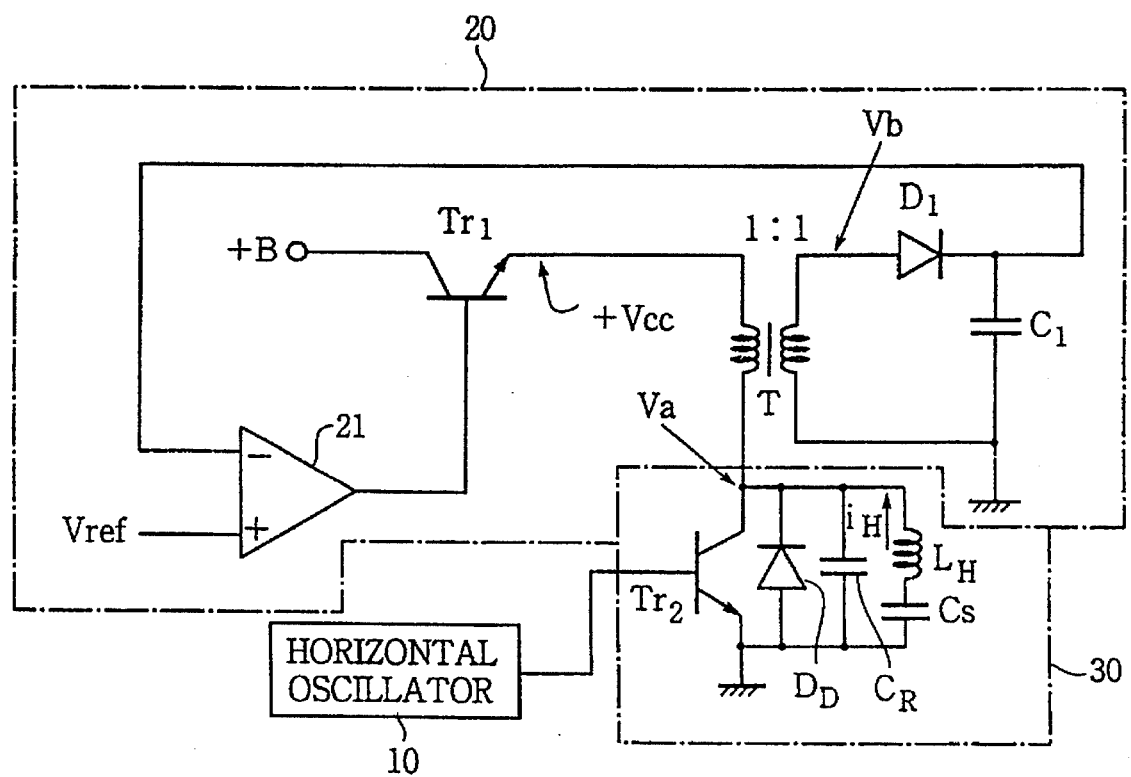
FIG. 4 is a schematic diagram showing a conventional stabilizing circuit for stabilizing the horizontal picture size on the display of a television receiver.

FIG. 1 shows an improved stabilizing circuit according to the first embodiment of the present invention, where the same elements as those in FIG. 4 are represented by the like reference numerals. As understood in FIG. 1, a difference between the first embodiment of the present invention and the prior art shown in FIG. 4 is that a multiplier 22, which is adapted to multiply the output Vcc with $(\pi/2)$, is provided in the horizontal output stabilizing circuit 20.

In detail, the multiplier 22 is provided on the emitter side of the control transistor Tr1. In this manner, the output $(\pi/2) \cdot Vcc$ from the multiplier 22 is added, by means of an adder 23, into the output from the rectifying/smoothing circuit consisting of the diode D1 and capacitor C1, the total output thus added together is then applied to the differential amplifier 21.

When a ratio of the primary voltage to the secondary voltage of the horizontal output transformer T is 1:1, Va will be equal to Vb. Further, when the output pulse Vb from the secondary coil of the transformer T is caused to feedback under a stabilized level, the collector pulse (collector voltage) Va of the horizontal output transistor Tr2 may also be expressed in the flowing equation (1).

$$Va=(\pi/2) \cdot (ts/tr) \cdot Vcc \qquad (1)$$

By replacing ts with (T−tr) and further expanding the equation, we can get an expanded equation as follows.

$$\begin{aligned} Va &= (\pi/2) \cdot [(T-tr)/tr] \cdot Vcc \\ &= (\pi/2) \cdot [(T/tr) \cdot Vcc - (\pi/2) \cdot Vcc \end{aligned}$$

By moving—$(\pi/2) \cdot Vcc$ to the left side of the equation, the equation will become as follows.

$$Va+(\pi/2) \cdot Vcc=(\pi/2) \cdot (T/tr) \cdot Vcc$$

Finally, the above equation may be concluded as:

$$Vcc=2/\pi \cdot tr \cdot f \,[Va+(\pi/2) \cdot Vcc] \qquad (3)$$

It is understood from the equation (3) that, by multiplying the output Vcc with $(\pi/2)$, so long as the $[Va+(\pi/2) \cdot Vcc]$ is maintained constant, the output Vcc will become completely proportional to the horizontal scanning frequency f, if there is a change in such horizontal scanning frequency.

As shown in FIG. 1, with the use of the multiplier 22, an output $(\pi/2) \cdot Vcc$ is obtained. Such output $(\pi/2) \cdot Vcc$ and the output Vb (=Va) are added together by means of the adder 23. The total output thus added is then feedback to the differential amplifier 21. In this way, since the $[Va+(\pi/2) \cdot Vcc]$ is maintained constant, the Vcc becomes completely proportional to the horizontal scanning frequency f.

In general, if there is an increase in the horizontal scanning frequency f of the horizontal synchronizing signal being input to the base of the transistor Tr2 from the horizontal osillator 10, there will be an increase in the frequency of the collector pulse (collector voltage) Va of the horizontal transistor Tr2, causing a decrease in the horizontal deflection current. But, according to the first embodiment of the present invention as shown in FIG. 1, since the $[Va+(\pi/2) \cdot Vcc]$ can be maintained constant and be controlled so to feedback without changing, the output Vcc from the control transistor Tr1 becomes larger. In this way, even if there will be a change in the horizontal scanning frequency, the horizontal deflection current can be maintained constant, thereby obtaining a stabilized horizontal picture size on the display of a television receiver.

Figure 2:
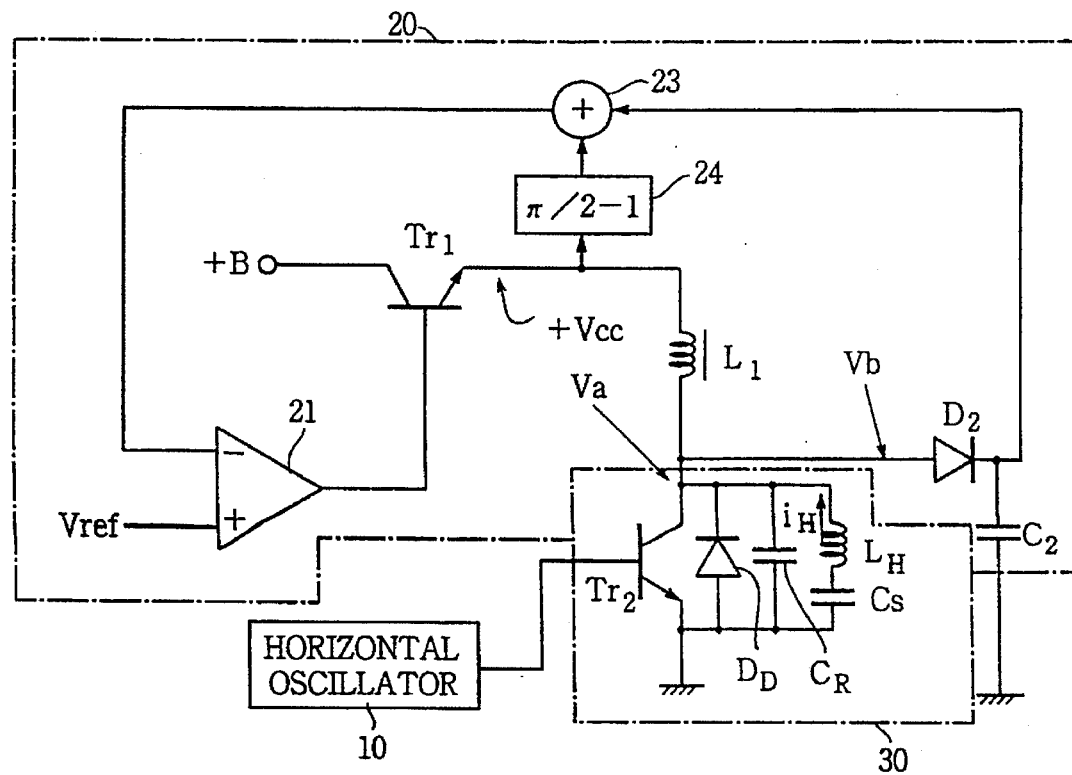
FIG. 2 is a schematic diagram showing another improved stabilizing circuit for stabilizing the horizontal picture size on the display of a television receiver, according to the second embodiment of the present invention.

FIG. 2 shows another improved stabilizing circuit according to the second embodiment of the present invention, where the same elements as those in FIGS. 1 and 4 are represented by the like reference numerals.

The circuit system shown in FIG. 2 includes a chock coil L1 instead of a transformer. An output Vb from the chock coil L1 is fed into a rectifying/smoothing circuit consisting of a diode D2 and a capacitor C2 so as to be rectified and smoothed. The smoothed output is then applied to the adder 23. Meanwhile, the output Vcc from the control transistor Tr1 is multiplied by $(\pi/2-1)$ in a multiplier 24, and is then fed to the adder 23. In this way, the Vb and Vcc·$(\pi/2-1)$ are added together so as to feedback into the differential amplifier 21.

In the horizontal size stabilizing circuit as shown in FIG. 2, a pulse voltage Vb from the chock coil L1 may be expressed in the flowing equation.

Figure 3:
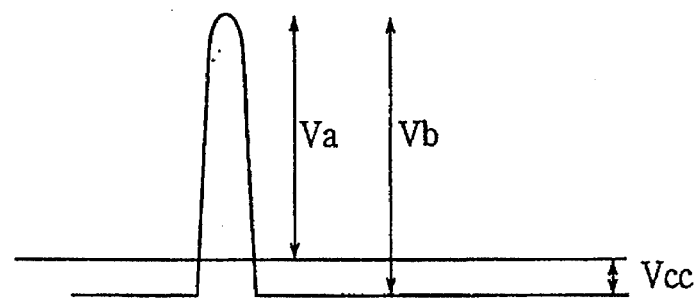
FIG. 3 is a graph indicating an effect of multiplier means incorporated in the improved stabilizing circuits, according to the first and second embodiments of the present invention.

As indicated in FIG. 3, Vb is a pulse voltage obtained by adding together the horizontal output pulse Va and the output Vcc.

$$Vb = Va + Vcc$$

By replacing Va with the equation (1), we can obtain equation as follows.

$$\begin{aligned} Vb &= (\pi/2) \cdot (ts/tr) \cdot Vcc + Vcc \\ &= (\pi/2) \cdot (T - tr/tr) \cdot Vcc + Vcc \\ &= (\pi/2) \cdot 19\ (T/tr) \cdot Vcc - (\pi/2) \cdot Vcc + Vcc \\ &= (\pi/2) \cdot 19\ (T/tr) \cdot Vcc - (\pi/2 - 1) \cdot Vcc \end{aligned}$$

Thus $$Vb + (\pi/2 - 1) \cdot Vcc = (\pi/2) \cdot (T/tr) \cdot Vcc$$

As a result, we can obtain a new equation (4) as follows.

$$Vcc = (2/\pi) \cdot tr \cdot f[Vb + (\pi/2 - 1) \cdot Vcc] \quad (4)$$

As understood from the equation (4), by multiplying the output Vcc with $(\pi/2-1)$, the emitter output Vcc of the control transistor Tr1 becomes complete proportional to the horizontal scanning frequency f, even if there is a change in the horizontal scanning frequency f.

In this way, if there is an increase in the horizontal scanning frequency f and the horizontal deflection current becomes small, the [Vb+$(\pi/2-1)$·Vcc] is maintained constant, and is controlled so as to feedback without changing, therefore the output Vcc from the control transistor Tr1 becomes larger. In this way, even if there is a change in the horizontal scanning frequency, the horizontal deflection current can be maintained constant, thus obtaining a stabilized horizontal picture size on the display of a television receiver.

Referring again to FIG. 1, it is also possible that the ratio of the primary voltage to the secondary voltage of the horizontal output transformer T may be 1:N. In such a case, the multiple of the multiplier 22 becomes $(\pi/2) \cdot N$ to match the ratio 1:N of the transformer T, so that the output Vcc from the transistor Tr1 is multiplied by $(\pi/2) \cdot N$ in the multiplier 22.

Namely, $$Vb = N \cdot Va$$

Replacing Va with equation (1) $\{Va=(\pi/2) \cdot (ts/tr) \cdot Vcc\}$, we can obtain equations as follows.

$$Vb = N \cdot (\pi/2) \cdot (ts/tr) \cdot Vcc$$

By replacing ts with (T−tr) and further expanding the equation, we can get an expanded equation as follows.

$$\begin{aligned} Vb &= N \cdot (\pi/2) \cdot [(T - tr)/tr] \cdot Vcc \\ &= N \cdot (\pi/2) \cdot [(T/tr) \cdot Vcc - N \cdot (\pi/2) \cdot Vcc \end{aligned}$$

thus, $$N \cdot (\pi/2) \cdot [(T/tr) \cdot Vcc = Vb + N \cdot (\pi/2) \cdot Vcc$$

Finally, the above equation may be concluded as:

$$Vcc = (1/N)(2/\pi) \cdot f\ [Vb + (\pi/2) \cdot N \cdot Vcc]$$

It is understood from the above equation that, by multiplying the output Vcc with $(\pi/2) \cdot N$, the output Vcc will become completely proportional to the horizontal scanning frequency f, even if there is a change in such horizontal scanning frequency.

With the use of the horizontal picture size stabilizing circuit according to the present invention, since the output voltage applied to the horizontal output circuit is complete proportional to the horizontal scanning frequency, it becomes possible to stabilize the horizontal picture size on the display of a television receiver, irrespective of a change in the horizontal scanning frequency.

While the presently preferred embodiments of the this invention have been shown and described above, it is to be understood that these disclosures are for the purpose of illustration and that various changes and modifications may be made without departing form the scope of the invention as set forth in the appended claims.

What is claimed is:

1. A stabilizing circuit for stabilizing the horizontal picture size on the display of a television receiver, wherein a video signal containing a horizontal synchronizing signal having a horizontal scanning frequency is inputted, said stabilizing circuit comprising:

a horizontal output circuit including a horizontal output transistor and a horizontal deflection coil for receiving a signal sychronizing with said horizontal synchronizing signal and corresponding to said horizontal scanning frequency and for supplying a horizontal deflection current;

a power source for supplying an electric power to the above horizontal output circuit;

a control transistor connected between the power source and the horizontal output transistor;

an output voltage generating circuit for generating an output voltage corresponding to an output pulse from the horizontal output transistor;

a multiplier for multiplying the output from the control transistor with a predetermined multiple;

an adder for adding together the output from the multiplier and the output from the output voltage generating circuit, thereby controlling the control transistor by virtue of the output from the adder.

2. A stabilizing circuit according to claim 1, wherein said output voltage generating circuit comprises:

a transformer whose primary coil is connected between the horizontal output transistor and the control transistor;

a rectifying/smoothing circuit connected to the secondary coil of the transformer;

wherein the voltage ratio of the primary coil to the secondary coil of the transformer is 1:N (N is a positive natural number);

wherein the output from the rectifying/smoothing circuit is fed to the adder, whilst the multiplier multiplies the output from the control transistor with $(\pi/2) \cdot N$ before said output is fed to the adder.

3. A stabilizing circuit according to claim 1 or 2, wherein the voltage ratio of the primary coil to the secondary coil of the transformer is 1:1, and wherein the output from the rectifying/smoothing circuit is fed to the adder, whilst the multiplier multiplies the output from the control transistor with $(\pi/2)$ before said output is fed to the adder.

4. A stabilizing circuit according to claim 1, wherein the output voltage generating circuit comprises:

a rectifying/smoothing circuit for directly rectifying the output of the horizontal output transistor, wherein the output from the rectifying/smoothing circuit is fed to the adder, whilst the multiplier multiplies the output from the control transistor with $(\pi/2-1)$ before said output is fed to the adder.

\* \* \* \* \*